Patented Aug. 25, 1925.

1,551,471

UNITED STATES PATENT OFFICE.

HENRY V. DUNHAM, OF MOUNT VERNON, NEW YORK.

MODIFIED CASEIN AND PROCESS OF MAKING SAME.

No Drawing. Application filed March 22, 1923. Serial No. 626,961.

*To all whom it may concern:*

Be it known that I, HENRY V. DUNHAM, a citizen of the United States, residing at Mount Vernon, in the county of Westchester and State of New York, have invented certain new and useful Improvements in Modified Casein and Processes of Making Same, of which the following is a specification.

This process has for its object the manufacture of a novel casein product well suited for use in sizing and finishing paper, leather and cloth, when a low-viscosity dissolved sizing is desired. The product is also of value as the starting point for the manufacture of medicinal products because of its peculiar properties, some of which are herein described. When casein is dissolved, with a considerable excess of sodium or potassium hydroxide, in water, with the aid of heat, a portion of the nitrogen content of the casein is broken down forming ammonia ($NH_3$), at the same time the casein solution begins to change in color to a light yellow and later to a yellowish brown solution. During this treatment the casein solution is reduced in viscosity and finally becomes a very thin solution depositing or throwing out of solution a soft opaque white precipitate which may amount to about 6 to 10% of the weight of the original casein. If, after the above mentioned reaction has taken place to the desired degree, an ammonium salt, such as ammonium chloride is added in sufficient amount to react with the excess of caustic alkali present, there will be formed from the excess of NaOH, ammonium hydroxide and common salt. By boiling the mixture, or by drying the casein product, the ammonia is expelled from the product. This casein product when finished may be neutral, slightly acid, or slightly alkaline, depending upon the amount of $NH_4Cl$ used to neutralize the caustic alkali in the casein mixture.

In order to more clearly describe this process, I give below an example of procedure which is by way of illustration only, since the proportions of NaOH and therefore of $NH_4Cl$ can be varied considerably, depending upon the grade or quality of casein used and the alkalinity, neutrality or acidity of the product desired. To 100 pounds of casein I add 300 pounds of water and 15 pounds of caustic soda. This represents a considerable excess of the latter. These are well mixed together and heated to about 170° F. The mixture is now allowed to stand, with occasional stirring, for about three hours or longer. I then add 15 pounds of ammonium chloride, which has been dissolved in a little water, in order to neutralize or change over all or nearly all of the free NaOH remaining. The mixture is then boiled or well heated again and tested for free NaOH. If any is found, more ammonium chloride is added, little by little, until the mixture is neutral, or one may, if desired, leave the solution slightly alkaline by leaving a portion of the NaOH unchanged. In any case, when the desired alkalinity or neutrality is secured, the solution may be further concentrated by evaporation in any of the well known evaporators or it may be completely dried. A good method for making it into a dry powder is to dry the solution on a so-called "Just" milk drying machine. The resulting powder may be sifted when it is ready for use. About 90% yield can be secured, based on the amount of casein used.

In this example, the liquid was not filtered before the drying operation, although such filtration is not precluded, and may even be advantageous if a product is wanted which will give an entirely clear solution.

In place of ammonium chloride, I may use other ammonium salts to react with the free caustic alkali, the object being to destroy the extremely alkaline properties of the caustic alkali after it has acted upon the casein, without precipitating the casein or the greater portion thereof, as would be the case if strong acids were to be used. For example, I may use ammonium sulfate in place of the chloride or if I desire an alkaline product (but not caustic), I may use ammonium phosphate or other ammonium salts may be used, such as the carbonate, oxalate, persulfate, tungstate or fluoride. Various other ammonium salts could be used.

This new product possesses many distinct chemical and physical properties, of which the following may be noted:

1. If this product is dissolved by means of a solvent commonly used to dissolve casein, for example borax, and the resulting solution precipitated with an acid, for example, by hydrochloric acid, only from 40 to 50% of the original weight of the casein is coagulated, whereas with casein under the same conditions the entire amount would be precipitated.

2. If the modified casein is mixed with cold water, for example one part modified casein with 4 parts cold water an apparently opaque solution is the result. However, on heating this solution, about 35% is precipitated or thrown out, leaving the balance of the material as a water clear solution. This latter solution is not precipitated by alkalies or acids. An analysis of the dried residue of this solution shows nitrogen 10.57% and ash about 8½%.

3. If ferric chloride is added to that last mentioned clear solution under 2, there is a precipitate formed amounting to about 37% on the basis of the dry modified casein used. This product, when dry, shows an analysis 11.55% nitrogen, 8.16% ash (including 4.56% ferric oxide). The product is entirely soluble in 1% solution of hydrochloric acid.

I claim:

1. The process of treating casein with water containing considerably more free caustic alkali than the amount needed to dissolve the same, heating same sufficiently to liberate a portion of the nitrogen content of the casein in the form of ammonia, and thereafter neutralizing at least a large part of the remaining caustic alkali with an ammonium salt.

2. A process which comprises adding to casein material, with water, a caustic alkali in substantial excess over the amount necessary to dissolve the same, allowing the alkali to act until the viscosity is only a small fraction of the normal viscosity of a solution of undecomposed casein in mild alkali and containing the same amount of casein, showing the formation of a chemically modified casein, adding an ammonium salt in amount to react with the major part at least of the excess caustic alkali.

3. A process which comprises adding to casein material, with water, a caustic alkali in substantial excess over the amount necessary to dissolve the same, allowing the alkali to act until the viscosity is only a small fraction of the normal viscosity of a solution of undecomposed casein in mild alkali and containing the same amount of casein, showing the formation of a chemically modified casein, adding an ammonium salt and thereafter drying the liquid.

4. A process which comprises adding to casein material, with water, a caustic alkali in substantial excess over the amount necessary to dissolve the same, allowing the alkali to act until the viscosity is only a small fraction of the normal viscosity of a solution of undecomposed casein in mild alkali and containing the same amount of casein, showing the formation of a chemically modified casein, adding a salt of a volatile base and heating sufficiently to drive off volatile base.

5. A process which comprises adding water and an excess of caustic alkali to casein and heating sufficiently to form ammonia, and thereafter neutralizing excess alkali with an ammonium compound.

6. A modified casein product, which, when dissolved in an ordinary casein solvent and acidified will throw down a precipitate amounting to only about half the quantity of the original casein, such modified casein product forming an apparent solution with cold water, which solution when boiled will throw down a precipitate equal in amount to about a third of the original casein, leaving a clear solution of a material containing about 10.5% N.

In testimony whereof I affix my signature.

HENRY V. DUNHAM.